(12) United States Patent
Gessel et al.

(10) Patent No.: US 11,825,770 B1
(45) Date of Patent: Nov. 28, 2023

(54) AGRICULTURAL VEHICLE WITH DEBRIS-PURGING CLUTCH ASSEMBLY

(71) Applicant: CNH Industrial America LLC, New Holland, PA (US)

(72) Inventors: James M. Gessel, Geneseo, IL (US); Thamilselvan Karuppannan, Bettendorf, IA (US); Dan L. Garland, Solon, IA (US); Jonathan E. Ricketts, Coal Valley, IL (US); Brian P. Crow, Andalusia, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/853,285

(22) Filed: Jun. 29, 2022

(51) Int. Cl.
*A01D 69/12* (2006.01)
*F16D 23/00* (2006.01)
*A01D 69/08* (2006.01)

(52) U.S. Cl.
CPC ............ *A01D 69/12* (2013.01); *A01D 69/08* (2013.01); *F16D 23/00* (2013.01); *F16D 2300/06* (2013.01)

(58) Field of Classification Search
None
See application file for complete search history.

(56) References Cited

U.S. PATENT DOCUMENTS

| | | | |
|---|---|---|---|
| 3,858,384 A | 1/1975 | Maiste et al. | |
| 4,771,864 A * | 9/1988 | Lorimor | F16F 15/163 184/6.12 |
| 5,622,034 A | 4/1997 | Dommert | |
| 6,601,855 B1 * | 8/2003 | Clark | F16J 3/042 277/561 |
| 7,937,918 B1 | 5/2011 | Mossman | |
| 2007/0289308 A1 * | 12/2007 | Nest | F02C 7/232 60/772 |
| 2017/0089402 A1 * | 3/2017 | Deakin | F16D 25/14 |
| 2019/0203745 A1 * | 7/2019 | Winter | F15B 21/005 |

FOREIGN PATENT DOCUMENTS

DE    103 29 409 A1    2/2005

* cited by examiner

*Primary Examiner* — Timothy Hannon
(74) *Attorney, Agent, or Firm* — Peter K. Zacharias

(57) ABSTRACT

A clutch assembly includes: a drive hub having a spline configured to couple to a gearbox; a clutch housing coupled to the drive hub and having an end face defining an opening therein; a clutch hub disposed within the clutch housing and having a portion that extends out of the opening, the clutch hub being rotatable with respect to the clutch housing during a slip condition; a primary seal disposed between the clutch housing and the clutch hub; a quantity of purging compound disposed between the clutch housing and the clutch hub; and an end washer coupled to the clutch hub and facing the end face, the end washer and the end face defining a purge gap therebetween such that rotation of the clutch hub relative to the clutch housing causes some of the purging compound to eject from the clutch housing through the purge gap.

20 Claims, 4 Drawing Sheets

AGRICULTURAL VEHICLE WITH DEBRIS-PURGING CLUTCH ASSEMBLY

FIELD OF THE INVENTION

The present invention pertains to agricultural vehicles and, more specifically, to agricultural vehicles that include clutch assemblies.

BACKGROUND OF THE INVENTION

An agricultural harvester known as a "combine" is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue handling system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like, and an unloading system on the combine is actuated to transfer the grain into the vehicle.

More particularly, a rotary threshing or separating system includes one or more rotors that can extend axially (front to rear) or transversely (side to side) within the body of the combine, and which are partially or fully surrounded by perforated concaves. The crop material is threshed and separated by the rotation of the rotor within the concaves. Coarser non-grain crop material such as stalks and leaves pass through a straw beater to remove any remaining grains, and then are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve), where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material which passes through the upper sieve, but does not pass through the lower sieve, is directed to a tailings pan. Grain falling through the lower sieve lands on a bottom pan of the cleaning system, where it is conveyed forwardly toward a clean grain auger. The clean grain auger conveys the grain to a grain elevator, which transports the grain upwards to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

Agricultural harvesters are often operating in conditions where there is a substantial amount of dust, dirt, crop material, etc., which may be collectively referred to as "debris." One persistent issue that arises during harvesting is the effect of debris on operation of the harvester. The debris can include large and/or coarse particles, such as rocks, but also include fine particles, such as dust and crop residue. Both types of debris can detrimentally affect operation of the harvester. For example, rocks can be flung at high speeds and cause deforming damage and chips. On the other hand, fine debris can find its way into spaces between moving components and cause excess friction, clogging of the apparatus, and wear.

What is needed in the art is a way to reduce the detrimental effects of debris on agricultural harvester components.

SUMMARY OF THE INVENTION

Exemplary embodiments disclosed herein provide a clutch assembly with a clutch housing, a clutch hub disposed in the clutch housing that can rotate relative to the clutch housing, and an end washer coupled to the clutch hub and facing an end face of the clutch housing to define a purge gap therebetween that allows purging compound to eject from the clutch housing through the purge gap.

In some exemplary embodiments provided according to the present disclosure, a clutch assembly includes: a drive hub having a spline configured to couple to a gearbox; a clutch housing coupled to the drive hub and having an end face defining an opening therein; a clutch hub disposed within the clutch housing and having a portion that extends out of the opening, the clutch hub being rotatable with respect to the clutch housing during a slip condition; a primary seal disposed between the clutch housing and the clutch hub; a quantity of purging compound disposed between the clutch housing and the clutch hub; and an end washer coupled to the clutch hub and facing the end face, the end washer and the end face defining a purge gap therebetween such that rotation of the clutch hub relative to the clutch housing causes some of the purging compound to eject from the clutch housing through the purge gap.

In some exemplary embodiments provided according to the present disclosure, a header for an agricultural vehicle includes a header frame, a gearbox carried by the header frame, and a clutch assembly. The clutch assembly includes a drive hub having a spline coupled to the gearbox; a clutch housing coupled to the drive hub and having an end face defining an opening therein; a clutch hub disposed within the clutch housing and having a portion that extends out of the opening, the clutch hub being rotatable with respect to the clutch housing during a slip condition; a primary seal disposed between the clutch housing and the clutch hub; a quantity of purging compound disposed between the clutch housing and the clutch hub; and an end washer coupled to the clutch hub and facing the end face, the end washer and the end face defining a purge gap therebetween such that rotation of the clutch hub relative to the clutch housing causes some of the purging compound to eject from the clutch housing through the purge gap.

One possible advantage that may be realized by exemplary embodiments provided according to the present disclosure is that the purge gap can act as a trap for fine debris to prevent the debris from entering further into the clutch assembly and causing excessive wear.

Another possible advantage that may be realized by exemplary embodiments provided according to the present disclosure is that the purging compound ejecting through the purge gap can also clear out the purge gap of fine debris, further reducing the risk of debris entering further into the clutch assembly.

Yet another possible advantage that may be realized by exemplary embodiments provided according to the present disclosure is that the end washer can also protect the end face of the clutch housing from large debris to reduce the likelihood of dirt ingress into the clutch housing.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

Figure 1:
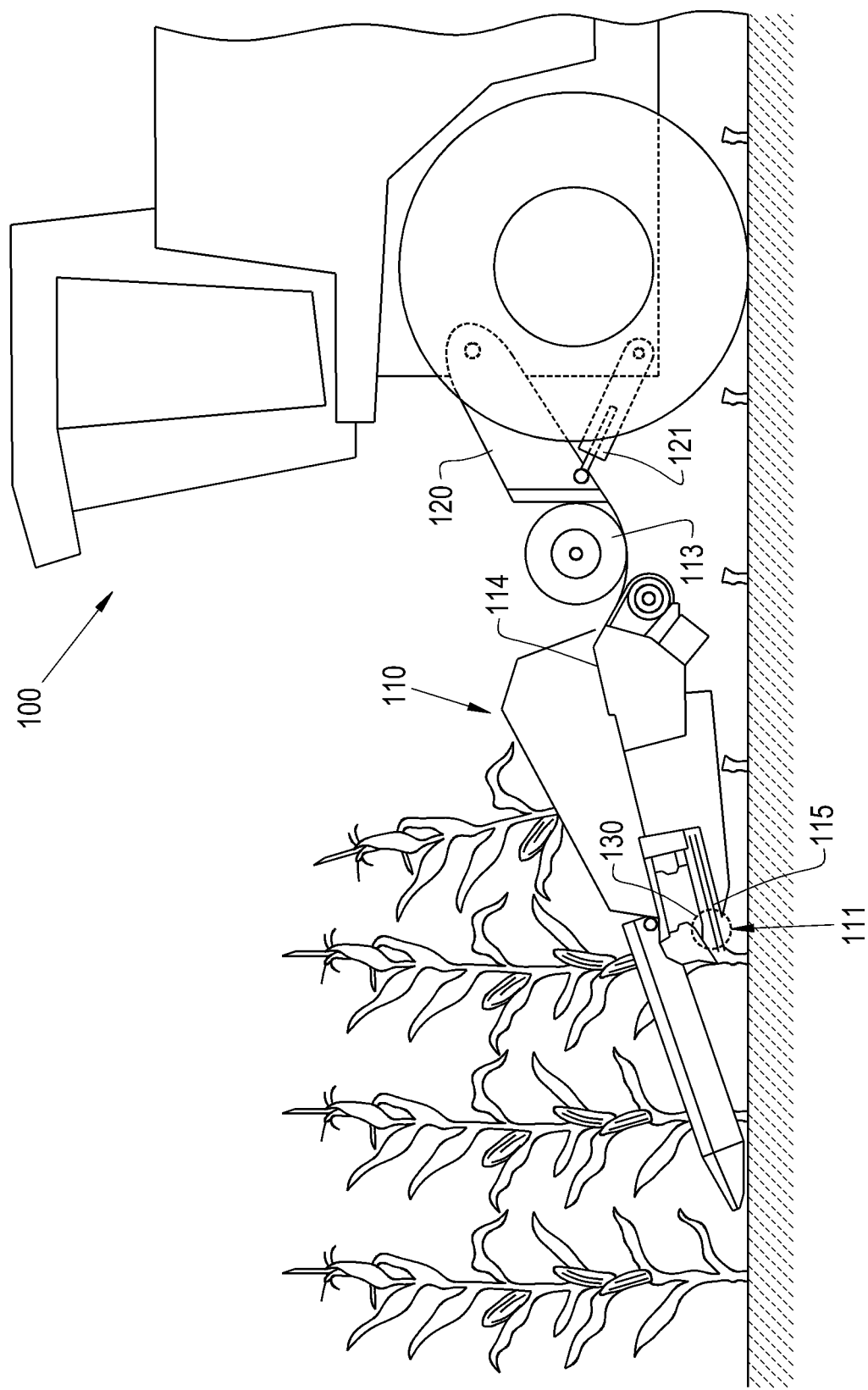
FIG. 1 illustrates a perspective view of an exemplary embodiment of an agricultural vehicle in the form of a combine carrying a header configured to harvest corn, in accordance with the present disclosure.

Referring now to FIG. 1, an exemplary embodiment of an agricultural vehicle 100 is illustrated in the form of a combine harvester that includes a header 110 that is configured for harvesting corn or other stalked crops. The header 110 is mounted to the vehicle 100 by a feeder housing 120 and an actuator 121. The header 110 includes a header frame 114 carrying one or more cutting units 111 that can be used to, for example, chop stalks using a rotated stalk chopper 115, which may be a bladed wheel and also be referred to as a "cutting element." Crop material collected by the header 110 may then be conveyed to the feeder housing 120 by a screw conveyor 113. The cutting units 111 may be driven by connection to a gearbox 130.

In known agricultural vehicles, a clutch assembly may be provided for coupling and decoupling the gearbox to the cutting units. Many clutch assemblies are what are known as "slip clutch" assemblies that allow slip under certain conditions. When harvesting corn and other stalked crops, chopped up pieces of the stalk and other debris have a tendency to infiltrate the clutch assembly and cause excessive friction between the moving components. This excessive friction is not only harmful due to causing excessive wear but also increases the input torque required to clip the clutch, which could lead to damage or failure of the cutting units. Some efforts to reduce the detrimental effects of debris have included providing a seal in the housing of the clutch assembly to reduce the infiltration of debris. However, the debris that is produced during corn harvesting especially is propelled at high speeds and infiltrates the clutch housing regardless.

Figure 2:
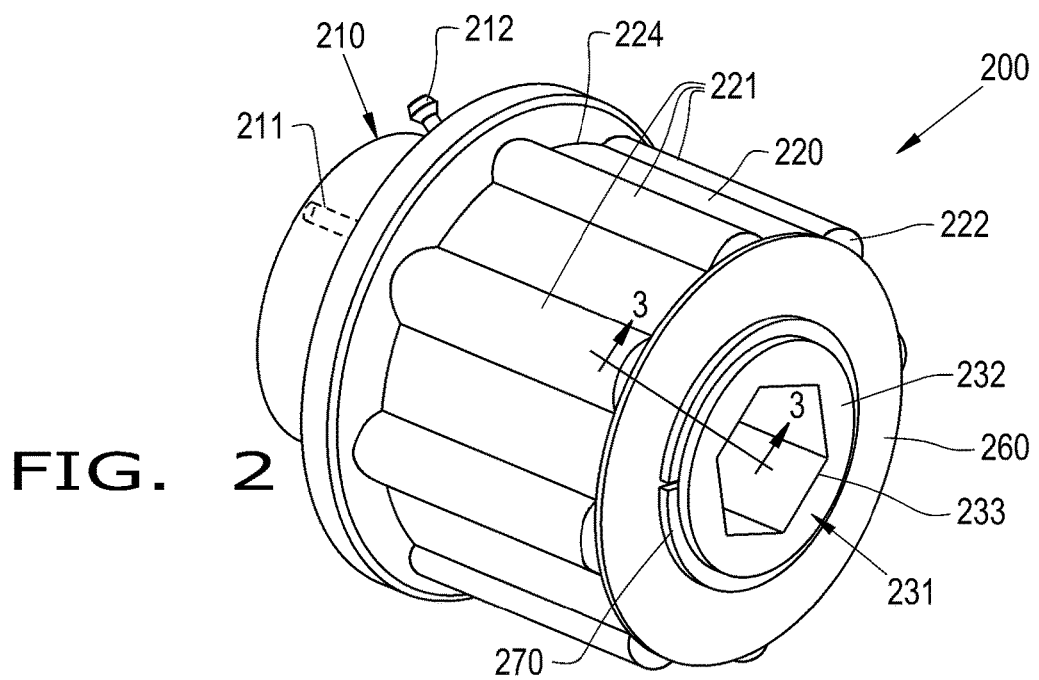
FIG. 2 illustrates a perspective view of an exemplary embodiment of a clutch assembly that may be included in the header of FIG. 1, provided in accordance with the present disclosure.
Figure 3:
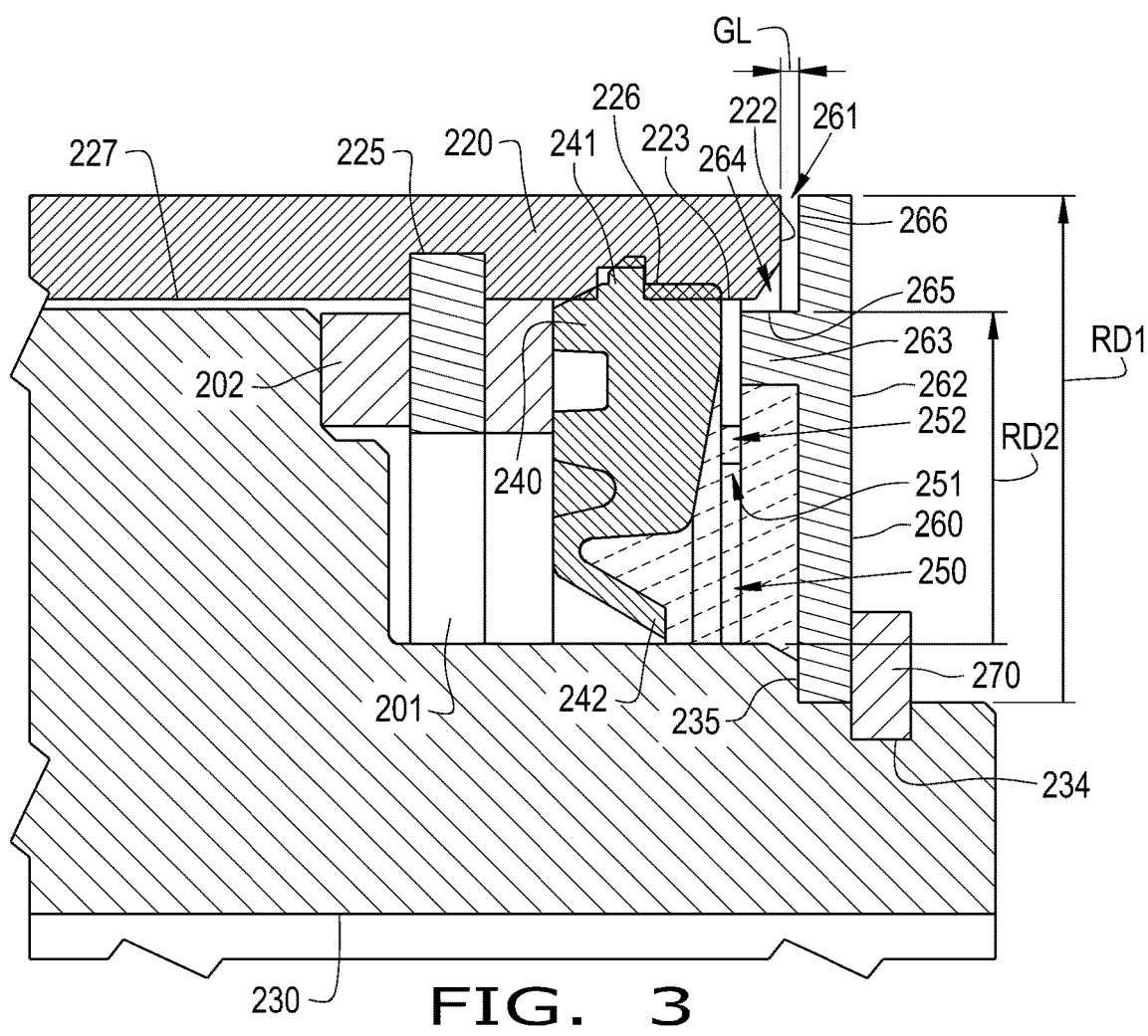
FIG. 3 illustrates a cross-sectional view of the clutch assembly of FIG. 2 taken along line 3-3.

To address some of the previously described issues with known agricultural vehicles, and referring now to FIGS. 2-3, an exemplary embodiment of a clutch assembly 200 is provided that includes a drive hub 210, a clutch housing 220 coupled to the drive hub 210, a clutch hub 230 disposed within the clutch housing 220, a primary seal 240 disposed between the clutch housing 220 and the clutch hub 230, a quantity of purging compound 250 disposed between the clutch housing 220 and the clutch hub 230, and an end washer 260 coupled to the clutch hub 230. The drive hub 210 includes a spline 211 that is coupled to the gearbox 130 or is configured to couple to the gearbox 130 if the clutch assembly 200 is disconnected from the gearbox 130. The drive hub 210 and the spline 211 may have any shapes and configurations that are suitable for coupling to the gearbox 130, with many such shapes and configurations being known. The drive hub 210 may also include a compound port 212 for introducing the purging compound 250 into the clutch housing 220 and the clutch hub 230. While the agricultural vehicle 100 is illustrated in the form of a combine harvester with a header configured for harvesting corn or other stalked crop, the present invention is similarly applicable other types of agricultural vehicles and implements, including but not limited to agricultural vehicles with headers configured for harvesting grain, rototillers, and other implements that utilize clutch assemblies to protect drive components, power take-off shafts, etc.

The clutch housing 220 is coupled to the drive hub 210. As illustrated, the clutch housing 220 may have a cylindrical shape with one or more lobes 221 extending from a circumferential surface of the housing 220. The clutch housing 220 has an end face 222 that defines an opening 223 therein. The opening 223 may extend from the end face 222 to an opposite end 224, which may be welded or otherwise coupled with the drive hub 210 so the clutch housing 220 is coupled to the drive hub 210. Referring specifically to FIG. 3, it is illustrated that the clutch housing 220 may have one or more grooves 225, 226 formed in an interior surface 227 of the clutch housing 220. One of the grooves 225 may house a snap ring 201 that is pressed against a thrust washer 202 that bears against the clutch hub 230. The other groove 226 may hold a portion of the primary seal 240 to hold the primary seal 240 in place.

The clutch hub 230 is disposed within the clutch housing 220. The clutch hub 230 includes a portion 231 that extends out of the opening 223 formed in the clutch housing 220 so the portion 231 resides outside the clutch housing 220. An end surface 232 of the portion 231 may have an opening 233 formed therein, which is illustrated in the shape of a hexagon. It should be appreciated that the shape of the opening 233 may be adjusted as desired. The clutch hub 230 is rotatable with respect to the clutch housing 220 during a slip condition, so the clutch assembly 200 acts as a "slip clutch." The slip condition that causes relative rotation between the clutch housing 220 and the clutch hub 230 may be an overload condition at one of the cutting units 111, such as one or more of the cutting units 111 hitting a large object and suddenly decelerating. It should be appreciated that the clutch hub 230 can be configured in a variety of ways to rotate with respect to the clutch housing 220, i.e, slip, in response to different conditions where slip is desired, as is known.

The primary seal 240 is disposed between the clutch housing 220 and the clutch hub 230. The primary seal 240 may include one or more sealing lips 241, 242 that engage one or more respective surfaces to form a seal. One of the sealing lips 241 may engage the clutch housing 220 while the other of the sealing lips 242 engages the clutch hub 230. The primary seal 240 may be, for example, an annular seal that is formed from a polymer. Many types of primary seals are known, and any suitable primary seal may be provided according to the present disclosure.

A quantity of purging compound 250 is disposed between the clutch housing 220 and the clutch hub 230. As illustrated in FIG. 3, the purging compound 250 may fill some or all of the space 251 between the clutch housing 220 and the clutch hub 230 that is not occupied by other elements of the clutch assembly 200. The purging compound 250 may be introduced into the space 251 through the compound port 212, as previously described. In some embodiments, the purging compound 250 is disposed in a compound reservoir 252 that is formed between the clutch housing 220, the clutch hub 230, the primary seal 240, and the end washer 260. The purging compound 250 may comprise a variety of compounds. In some embodiments, the purging compound 250 is a lubricant, such as grease, that also lubricates the various moving parts of the clutch assembly 200. Generally, the purging compound 250 should have a viscosity that allows it to flow out of the clutch assembly 200 under certain conditions to purge debris, as will be described further herein.

The end washer 260 is coupled to the clutch hub 230 and faces the end face 222 of the clutch housing 220. The end washer 260 and the end face 222 define a purge gap 261 therebetween such that rotation of the clutch hub 230 relative to the clutch housing 220 causes some of the purging compound 250 to eject from the clutch housing 220 through the purge gap 261. The purge gap 261 may define a gap length GL of, for example, no more than 1.2 mm in order to trap debris in the purge gap 261 while also providing a flow path for the purging compound 250. In this respect, the purge gap 261 can act as a trap for debris that is cleaned out when there is slip between the clutch hub 230 and the clutch housing 220 that forces purging compound 250 through the purge gap 261 and out of the clutch housing 220. The ejected purging compound 250 can entrain or otherwise force out the accumulated debris from the purge gap 261, reducing the risk of the trapped debris infiltrating further into the clutch housing 220. The end washer 260 can also protect other components of the clutch assembly 200, such as the primary seal 240 and the clutch housing 220, from wear damage caused by impacts with high-speed debris, such as flung corn stalk pieces and dirt. To increase the longevity of the end washer 260, the end washer 260 may comprise a wear-resistant material such as a metal, e.g., steel. Therefore, the end washer 260 provides a purge gap 261 to form a trap for debris while also providing a flow path for purging compound 250 to flow out of and purge the debris. Further, the end washer 260 can protect various components of the clutch assembly 200 from damage caused by impacts with high-speed debris.

To reduce the amount of debris that infiltrates the clutch housing 220, the end washer 260 may include a first ring section 262 and a second ring section 263 that is coupled to the first ring section 262. The first ring section 262 defines a first ring diameter RD1 and the second ring section 263 defines a second ring diameter RD2 that is less than the first ring diameter RD1. As illustrated, the first ring section 262 may be disposed entirely outside of the clutch housing 220 while the second ring section 263 is disposed between the clutch housing 220 and the clutch hub 230, i.e., the second ring section 263 extends at least partially into the opening 223. The first ring section 262 and the second ring section 263 may together form a debris trap 264 in the region of the purge gap 261, with the debris trap 264 being bound by a circumferential surface 265 of the second ring section 263, a face 266 of the first ring section 262, and the inner surface 227 of the clutch housing 220. The end washer 260 with the ring sections 262, 263 can thus act as a labyrinth to form the debris trap 264 and prevent infiltration of debris into the clutch housing 220.

To hold the end washer 260 in place, the clutch assembly 200 may include a snap ring 270 that is coupled to the clutch hub 230 and is configured to hold the end washer 260 in place. The clutch hub 230 may include a ring groove 234 formed in the portion 231, with the snap ring 270 partially disposed in the ring groove 234. The clutch hub 230 may also include a washer lip 235 formed adjacent to the ring groove 234. The snap ring 270 may force the end washer 260 against the washer lip 235, securing the end washer 260 between the washer lip 235 of the clutch hub 230 and the snap ring 270 to hold the end washer 260 in place. In some embodiments, the snap ring 270 is a split ring.

While the previously described clutch assembly 200 has an end washer 260 that forms a debris trap 264 to reduce infiltration of debris into the clutch housing 220, some exemplary embodiments provided according to the present disclosure utilize other ways to reduce debris infiltration. In some exemplary embodiments, and referring now to FIGS. 4-6, a clutch assembly 400 is provided that is similar to the previously described clutch assembly 200 in that the clutch assembly 400 includes a drive hub 410, a clutch housing 420 coupled to the drive hub 410, a clutch hub 430 disposed within the clutch housing 420, a primary seal 440 disposed between the clutch housing 420 and the clutch hub 430, a quantity of purging compound 450 disposed between the clutch housing 420 and the clutch hub 430, and an end washer 460 coupled to the clutch hub 430. For brevity of description, some elements of the clutch assembly 400 that are similar to a respective element of the clutch assembly 200 are not described further herein but are labeled in FIGS. 4-6 with a reference number that is raised by 200 relative to the reference number provided in FIGS. 2-3, e.g., a thrust washer that is similar to the thrust washer 202 of FIGS. 2-3 is labeled as 402 in FIGS. 4-6.

Figure 4:
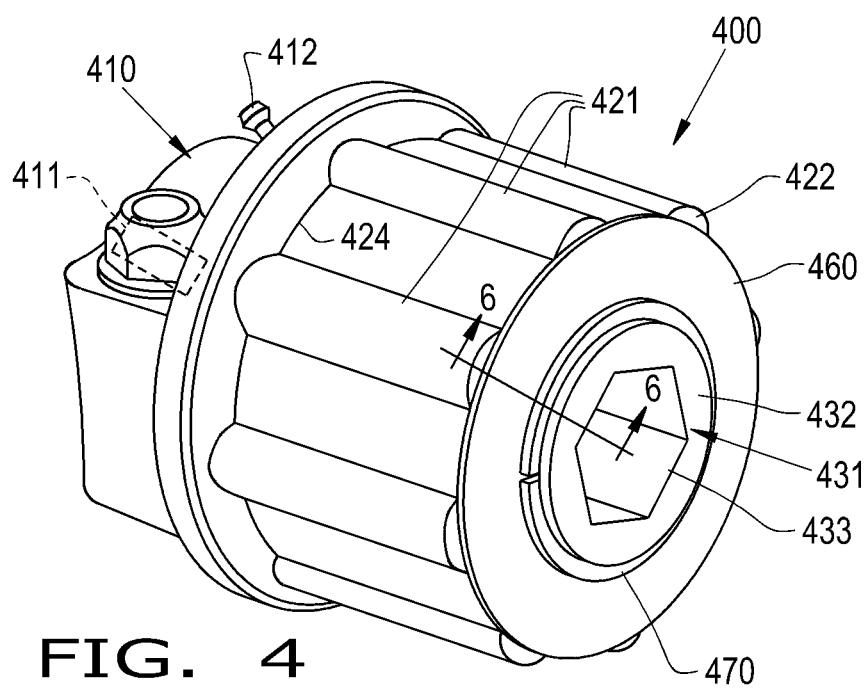
FIG. 4 illustrates a perspective view of another exemplary embodiment of a clutch assembly that may be included in the header of FIG. 1, provided in accordance with the present disclosure.
Figure 5:
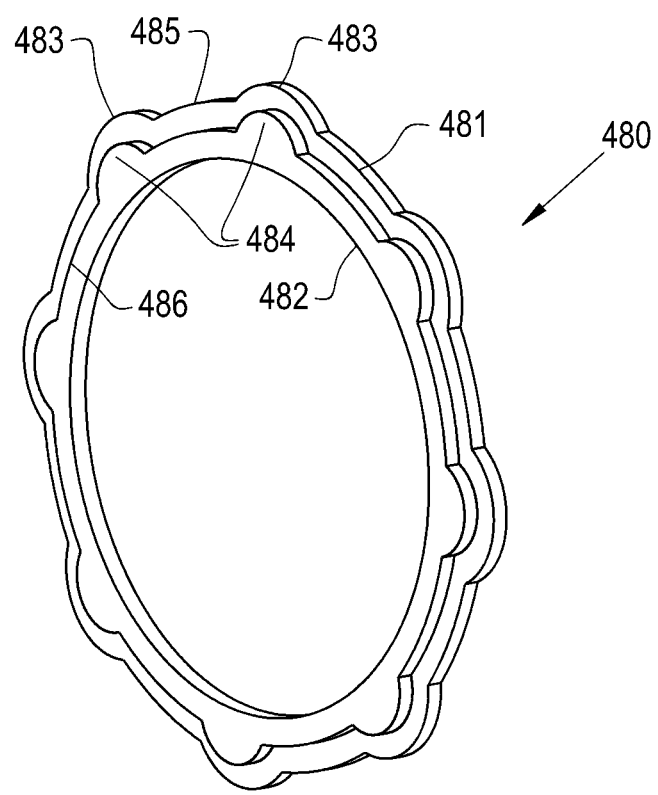
FIG. 5 illustrates a perspective view of an end seal of the clutch assembly of FIG. 4.
Figure 6:
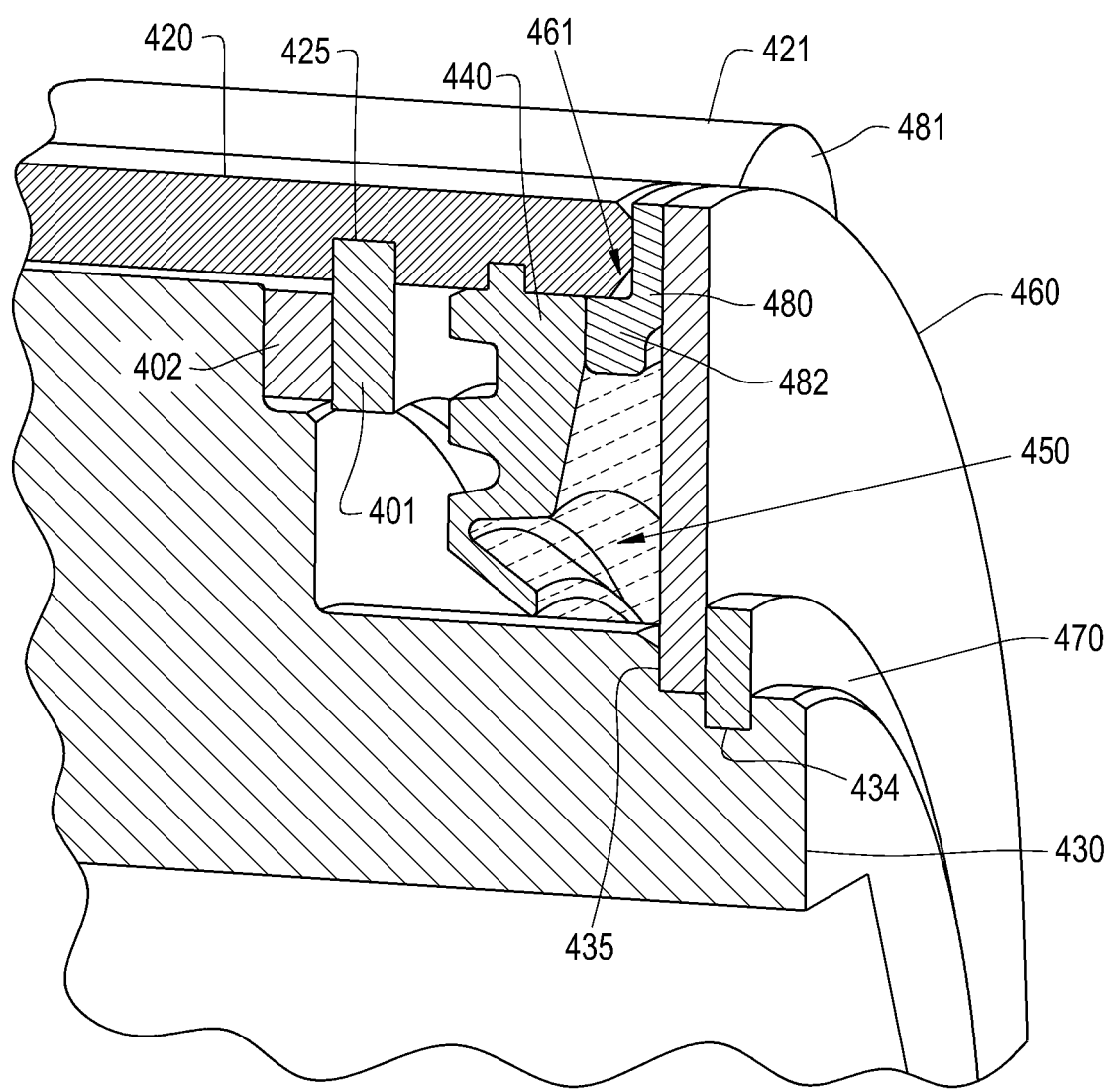
FIG. 6 illustrates a cross-sectional view of the clutch assembly of FIG. 4 taken along line 6-6.

The clutch assembly 400 of FIGS. 4-6 differs from the clutch assembly 200 of FIGS. 2-3 in that the clutch assembly 400 further includes an end seal 480 that is disposed between the clutch housing 420 and the end washer 460. The end seal 480, which is illustrated by itself in FIG. 5, may have a first seal section 481 that corresponds to a shape of the clutch housing 420 and a second seal section 482 that corresponds to a shape of the clutch hub 430 while still maintaining a purge gap 461 between the end seal 480 and the clutch housing 420. The purge gap 461 between the end seal 480 and the clutch housing 420 may also act as a debris trap, which is cleaned out when purging compound 450 is ejected through the purge gap 461. The end seal 480 may comprise a flexible material, such as a polymer, and act as a secondary seal to the primary seal 440 in order to reduce debris infiltration and purge accumulated debris. The end seal 480 may obviate the need for the end washer 460 forming a debris trap as previously described, so the end washer 460 may, in some embodiments, be a ring washer defining one diameter.

The seal sections 481, 482 of the end seal 480 may both include respective arced protrusions 483, 484 emanating from a respective circumference 485, 486 of each seal section 481, 482, with the arced protrusions 483, 484 being shaped and spaced to correspond to, for example, lobes 421 extending from the clutch housing 420. In some embodiments, the end washer 460 is rotatable relative to the end seal 480 such that rotation of the clutch hub 430 relative to the clutch housing 420 causes the end washer 460 to spin against the end seal 480. In such embodiments, the end seal 480 may be coupled with the clutch housing 420, e.g., at the arced protrusions 484, to hold the end seal 480 in place.

From the foregoing, it should be appreciated that the present disclosure also provides a method for purging debris from the clutch assembly 200, 400. The method can include introducing the purging compound 250, 450 into the space 251, 451 between the clutch housing 220, 420 and the clutch hub 230, 430 and rotating the clutch hub 230, 430 relative to the clutch housing 220, 420, i.e., inducing slip, so some of the purging compound 250, 450 is ejected from the clutch housing 220, 420 through the purge gap 261, 461 to remove debris. The slip may be intentionally induced or, alternatively, may be induced during operation of the clutch assembly 200, 400.

From the foregoing, it should be appreciated that the clutch assembly 200, 400 provided according to the present disclosure can reduce the risk of debris infiltration into the clutch housing 220, 420, clean out accumulated debris, and protect the components of the clutch assembly 200, 400 by providing the end washer 260, 460 to form the purge gap 261, 461. The end washer 260 can reduce the infiltration of debris alone by providing a labyrinth that forms a debris trap 264 and/or by acting in conjunction with the end seal 480 to form a debris trap. Regardless of how the debris trap is formed, the purging compound 250, 450 can be ejected from the clutch housing 220, 420 to clean out the debris trap and remove accumulated debris. Therefore, the clutch assembly 200, 400 provided according to the present disclosure reduces the risk of debris, whether fine or large, from detrimentally affecting the operation of the clutch assembly 200, 400.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A clutch assembly, comprising:
   a drive hub comprising a spline configured to couple to a gearbox;
   a clutch housing coupled to the drive hub and comprising an end face defining an opening therein;
   a clutch hub disposed within the clutch housing and comprising a portion that extends out of the opening, the clutch hub being rotatable with respect to the clutch housing during a slip condition;
   a primary seal disposed between the clutch housing and the clutch hub;
   a quantity of purging compound disposed between the clutch housing and the clutch hub; and
   an end washer coupled to the clutch hub and facing the end face, the end washer and the end face defining a purge gap therebetween such that rotation of the clutch hub relative to the clutch housing causes some of the purging compound to eject from the clutch housing through the purge gap.

2. The clutch assembly of claim 1, wherein the purging compound comprises a lubricant.

3. The clutch assembly of claim 1, wherein the end washer comprises a first ring section and a second ring section coupled to the first ring section, the first ring section defining a first ring diameter and the second ring section defining a second ring diameter that is less than the first ring diameter.

4. The clutch assembly of claim 3, wherein the first ring section is disposed entirely outside of the clutch housing and the second ring section is disposed between the clutch housing and the clutch hub.

5. The clutch assembly of claim 1, further comprising a snap ring coupled to the clutch hub and configured to hold the end washer in place.

6. The clutch assembly of claim 5, wherein the clutch hub comprises a ring groove formed in the portion that extends out of the opening and the snap ring is partially disposed in the ring groove.

7. The clutch assembly of claim 1, further comprising an end seal disposed between the clutch housing and the end washer.

8. The clutch assembly of claim 7, wherein the end washer is rotatable relative to the end seal such that rotation of the clutch hub relative to the clutch housing causes the end washer to spin against the end seal.

9. The clutch assembly of claim 7, wherein the purge gap is defined between the end seal and the clutch housing.

10. The clutch assembly of claim 7, wherein the end washer comprises a metal and the end seal comprises a polymer.

11. A header for an agricultural vehicle, comprising:
    a header frame;
    a gearbox carried by the header frame; and
    a clutch assembly comprising:
      a drive hub comprising a spline coupled to the gearbox;
      a clutch housing coupled to the drive hub and comprising an end face defining an opening therein;
      a clutch hub disposed within the clutch housing and comprising a portion that extends out of the opening, the clutch hub being rotatable with respect to the clutch housing during a slip condition;
      a primary seal disposed between the clutch housing and the clutch hub;
      a quantity of purging compound disposed between the clutch housing and the clutch hub; and
      an end washer coupled to the clutch hub and facing the end face, the end washer and the end face defining a purge gap therebetween such that rotation of the clutch hub relative to the clutch housing causes some of the purging compound to eject from the clutch housing through the purge gap.

12. The header of claim 11, wherein the purging compound comprises a lubricant.

13. The header of claim 11, wherein the end washer comprises a first ring section and a second ring section coupled to the first ring section, the first ring section defining a first ring diameter and the second ring section defining a second ring diameter that is less than the first ring diameter.

14. The header of claim 13, wherein the first ring section is disposed entirely outside of the clutch housing and the second ring section is disposed between the clutch housing and the clutch hub.

15. The header of claim 11, further comprising a snap ring coupled to the clutch hub and configured to hold the end washer in place.

16. The header of claim 15, wherein the clutch hub comprises a ring groove formed in the portion that extends out of the opening and the snap ring is partially disposed in the ring groove.

17. The header of claim 11, further comprising an end seal disposed between the clutch housing and the end washer.

18. The header of claim 17, wherein the end washer is rotatable relative to the end seal such that rotation of the clutch hub relative to the clutch housing causes the end washer to spin against the end seal.

19. The header of claim 17, wherein the purge gap is defined between the end seal and the clutch housing.

20. The header of claim 17, wherein the end washer comprises a metal and the end seal comprises a polymer.

\* \* \* \* \*